Patented Aug. 27, 1929.

1,726,310

UNITED STATES PATENT OFFICE.

ELMER H. PAYNE AND SAMUEL A. MONTGOMERY, OF WOODRIVER, ILLINOIS, ASSIGNORS TO STANDARD OIL COMPANY, OF WHITING, INDIANA, A CORPORATION OF INDIANA.

TREATMENT OF EMULSION OILS.

No Drawing.   Application filed March 1, 1922.   Serial No. 540,372.

The present invention relates to the treatmeans of emulsion oils and will be fully understood from the following description.

The emulsion oils treated in accordance with the present invention may suitably be any type of oil-water emulsion occurring in nature or in refinery practice, regardless of whether oil or water be the continuous phase, although it is especially directed to those emulsions in which oil is the continuous phase. Emulsion oils that have been treated in accordance with the present invention have been, for example, bottom settlings from crude oils such as mid-continent crude, separator's slop, gas-oil bottom settlings, paraffin distillate bottom settlings and emulsion crude oils, such as those occurring in California. We have discovered that it is possible to break down all such emulsions by means of the spent alkali solutions employed in the neutralization of acid treated hydrocarbon oils and gases.

The spent solutions used may suitably be the caustic soda or soda ash solutions used for neutralizing acid treated lubricating oils. For example, a spent soda ash solution may be used derived from a fresh soda ash solution of 18 to 20° Baumé and employed in the neutralization of sour oils and waxes treated with sulfuric acid until their alkalinity is reduced by more than one-third and preferably by more than one-half. The reduction of the alkalinity of the solution may take place by its successive use on acid treated materials of similar character or of different character, as, for example, oil and wax. The spent solutions employed are settled before use, any sulfonic salts present being largely thrown out by reason of the high salt content of the solution.

The emulsion oil to be broken down is admixed with from 0.25% to 5% by volume of the spent solution and the mixture is preferably heated to 150 to 210° F., say about 180° F., and agitated until thoroughly mixed. The emulsion is then allowed to settle while being maintained at such a temperature and stratification takes place with a clean-cut separation of oil and water and occasionally of an intermediate layer containing asphaltic matter, dirt and the like.

We claim:

1. The method of treating emulsion oils to effect separation of their constituents which consists in admixing therewith a relatively minor proportion of a spent alkaline solution derived from the neutralization of sour oils and containing materials extracted from such sour oils and maintaining the mixture at an elevated temperature until stratification takes place.

2. The method of treating emulsion oils to effect separation of their constituents which consists in admixing therewith a spent soda ash solution derived from an 18 to 20° Baumé soda ash solution employed in the neutralization of sour oils until its alkalinity is reduced more than one-half and containing materials extracted from such sour oils and maintaining the mixture at an elevated temperature until stratification takes place.

ELMER H. PAYNE.
SAMUEL A. MONTGOMERY.